United States Patent [19]

Hoch et al.

[11] 4,336,168

[45] Jun. 22, 1982

[54] STABLE LIQUID ANTIMONY STABILIZER COMPOSITIONS AND VINYL HALIDE RESINS CONTAINING SAME

[75] Inventors: Samuel Hoch, Brooklyn; Mario Q. Ceprini, Cedarhurst, both of N.Y.

[73] Assignee: Tenneco Chemicals, Inc., Piscataway, N.J.

[21] Appl. No.: 144,141

[22] Filed: Apr. 28, 1980

[51] Int. Cl.$^3$ ............................................... C08K 0000
[52] U.S. Cl. .............................. 524/300; 252/400 R; 260/446; 524/302; 524/301; 524/381; 524/399; 524/392; 524/567
[58] Field of Search ......... 260/45.75 B, 446, 45.85 H, 260/45.95 N, 45.85 R, 23 XA; 252/400 R

[56] References Cited

U.S. PATENT DOCUMENTS

| | | | |
|---|---|---|---|
| 2,680,726 | 6/1954 | Weinberg et al. | 260/45.75 B |
| 2,684,956 | 7/1954 | Weinberg et al. | 260/45.75 B |
| 2,789,963 | 4/1957 | Hecker | 260/429.7 |
| 2,996,528 | 8/1961 | Marks et al. | 260/446 |
| 3,063,963 | 11/1962 | Wooten et al. | 260/45.85 T |
| 3,242,133 | 3/1966 | Lindsey | 260/45.85 H |
| 3,454,514 | 7/1969 | Baum | 260/45.85 R |
| 3,507,827 | 4/1970 | Pollock | 260/45.85 H |
| 3,887,508 | 6/1975 | Dieckmann | 260/45.75 B |
| 4,115,352 | 9/1978 | Bohen et al. | 260/45.75 B |

FOREIGN PATENT DOCUMENTS 54-150453 11/1979 Japan .
2008596 6/1979 United Kingdom .

OTHER PUBLICATIONS

CA 68, 3221n (1968).
Modern Plastics-1963, pp. 156, 161, 164, 202.
SPE Journal, Aug. 1963, pp. 729-734.

*Primary Examiner*—V. P. Hoke
*Attorney, Agent, or Firm*—Evelyn Berlow

[57] ABSTRACT

Shelf-stable liquid antimony stabilizer compositions for vinyl halide resin compositions comprise a liquid antimony organic sulfur- and/or oxygen-containing compound, such as antimony tris-(isooctyl thioglycolate), and a stabilizing amount of an acidic organic compound that may be a mercaptoacid ester, mercaptan, mercaptoacid, mercaptoalcohol, monocarboxylic acid, or a mixture thereof.

16 Claims, No Drawings

STABLE LIQUID ANTIMONY STABILIZER COMPOSITIONS AND VINYL HALIDE RESINS CONTAINING SAME

This invention relates to shelf-stable liquid antimony stabilizer compositions for vinyl halide resin compositions and to a process for their production. It further relates to vinyl halide resin compositions that contain these stabilizer compositions.

Antimony organic sulfur- and/or oxygen-containing compounds, such as antimony mercaptoacid esters, antimony alkyl mercaptides, and antimony carboxylates, are known to be effective heat stabilizers for vinyl halide resin compositions. The preparation of these organic antimony compounds and their use as stabilizers are disclosed in a number of patents including U.S. Pat. Nos. 2,680,726, 2,684,956, 3,340,285, 3,347,821, 3,399,220, 3,466,261, and 3,530,158. In a process that is used commercially for the production of these antimony compounds, antimony oxide is reacted with a stoichiometrically equivalent amount of an acidic organic sulfur- and/or oxygen-containing compound, for example, a mercaptoacid ester, an alkyl mercaptan, or a monocarboxylic acid. The preparation of antimony mercaptoacid esters by this procedure is shown in the following equation:

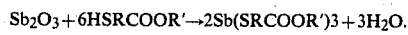

$$Sb_2O_3 + 6HSRCOOR' \rightarrow 2Sb(SRCOOR')_3 + 3H_2O.$$

When 3 moles of mercaptoacid ester is used per mole of antimony, as is shown in the equation, the reaction generally does not go to completion, and the liquid products obtained after filtration, which contain unreacted antimony oxide, are hazy and unstable. The instability of the antimony organic sulfur- and/or oxygen-containing compounds, their ineffectiveness in preventing the early discoloration of vinyl halide resin compositions, and their tendency to exude from resinous compositions have limited their use as stabilizers for vinyl halide resin compositions.

Attempts have been made to overcome these deficiencies by adding various materials to the antimony compounds, but the resulting stabilizers and resinous compositions containing these stabilizers have not proven to be entirely satisfactory. For example, it is disclosed in U.S. Pat. No. 3,887,508 that the use of antimony organic compounds in combination with metal carboxylates results in better heat stabilization of vinyl halide resin compositions. These combinations, however, are unstable and tend to deteriorate on storage. Other materials that have been proposed to improve the properties of antimony compounds as stabilizers for vinyl halide resin compositions include tri(alkali metal)-phosphates (U.S. Pat. No. 3,919,168), phenols (U.S. Pat. No. 4,029,618 and U.S. Pat. No. 4,158,640), and alkali metal and alkaline earth metal salts (U.S. Pat. No. 4,115,352).

In accordance with this invention, it has been found that the stability of liquid antimony organic sulfur- and/or oxygen-containing compounds and their effectiveness as heat stabilizers for vinyl halide resins can be improved substantially by incorporating in the liquid antimony compounds a stabilizing amount of an acidic sulfur- and/or oxygen-containing compound that is thoroughly compatible with the antimony compound. The resulting liquid antimony-containing stabilizer compositions are stable on prolonged storage, and they are effective heat stabilizers for vinyl chloride resin compositions. Resinous compositions that contain these stable liquid antimony stabilizer compositions are characterized by excellent early color and clarity and long term heat stability.

The antimony compounds that can be stabilized in accordance with this invention are antimony organic sulfur-containing compounds, antimony organic oxygen-containing compounds, and mixtures thereof that contain at least one —Sb—O— and/or at least one —Sb—S— linkage. They include the following types of antimony organic compounds:

(1) Antimony mercaptoacid esters having the formula $Sb(SRCOOR')_3$, wherein R represents alkylene, arylene, alkarylene, or aralkylene having 1 to 8 carbon atoms and R' represents alkyl, aryl, alkaryl, or aralkyl having 2 to 18 carbon atoms. Illustrative of these compounds are antimony tris-(ethyl thioglycolate), antimony tris-(isooctyl thioglycolate), antimony tris-(isooctyl β-mercaptopropionate), and dodecylmercaptoantimony bis-(isodecyl thioglycolate);

(2) Antimony mercaptides having the formula $Sb(SR')_3$, wherein each R' represents alkyl, aryl, alkaryl, or aralkyl having 2 to 18 carbon atoms. Examples of these compounds include antimony tris-(lauryl mercaptide), antimony di-(lauryl mercaptide)mono-(phenyl mercaptide), antimony tris-(benzyl mercaptide), antimony tris-(phenyl mercaptide), and antimony tris-(tolyl mercaptide);

(3) Antimony (mercaptoacid ester) (mercaptides) having the formula $(R'S)_n Sb(SRCOOR')_{3-n}$, wherein R and R' are as defined above and n is 1 or 2. These compounds include antimony mono-(isooctyl thioglycolate) di-(lauryl mercaptide), antimony di-(isooctyl thioglycolate) mono-(decyl mercaptide), antimony mono-(dodecyl thioglycolate) di-(isooctyl mercaptide), and antimony di-(isononyl thioglycolate) mono-(phenyl mercaptide);

(4) Bis-(antimony di-(mercaptoacid ester)) alkylene glycol dimercaptoacid esters having the formula $(R'OOCRS)_2$-Sb-S-$(CH_2)_m$-COO-$(CH_2)_p$-OOC-$(CH_2)_m$-S-Sb-$(SRCOOR')_2$ wherein R and R' are as defined above, m is 1–4, and p is 2–4. Examples of these compounds are bis-(antimony di-(isooctyl thioglycolate)) ethylene glycol dimercaptoacetate and bis-(antimony di-(dodecyl thioglycolate)) ethylene glycol dimercaptoacetate;

(5) Bis-(antimony di-(mercaptide or mercaptoacid ester)) sulfides having the formula $(R''S)_2$-Sb-S-Sb-$(SR'')_2$ wherein each R'' represents —RCOOR' or alkyl, aryl, alkaryl, or aralkyl having 2 to 18 carbon atoms. Illustrative of these compounds are bis-(antimony di-(lauryl mercaptide)) sulfide, bis-(antimony di-(isooctyl thioglycolate)) sulfide, and (antimony di-(lauryl mercaptide)) (antimony di-(isooctyl thioglycolate)) sulfide; and (6) Antimony carboxylates having the formula $Sb(OOCR''')_3$, wherein each R''' represents alkyl having 6 to 11 carbon atoms or phenyl. These compounds include antimony tris-n-heptanoate, antimony tris-(2-ethylhexanoate), antimony tris-benzoate, antimony tris-dodecanoate, antimony mono-n-heptanoate di-isononanoate, and antimony di-isooctanoate mono-decanoate.

The shelf-stable antimony stabilizer compositions of this invention may contain one or more antimony compounds of a single type, or they may contain two or more different types of antimony compounds.

The acidic compounds that are used to improve the shelf-stability of the liquid antimony organic sulfur- and/or oxygen-containing compounds and to impart excellent early color and clarity to vinyl chloride resin compositions that contain stabilizing amounts of the antimony compounds are those that contain an active thiol or carboxylic hydrogen atom, that are thoroughly compatible with the antimony compounds over a wide range of proportions, and that form clear homogeneous liquid solutions when mixed with the antimony compounds. They may be, for example, mercaptoacid esters of the formula HSRCOOR', mercaptans of the formula HSR', mercaptoacids of the formula HS-$(CR°_2)_n$-COOH, mercaptoalcohols of the formula HS-$(CR°_2)_n$-CH$_2$OH, monocarboxylic acids of the formula R'''COOH, or mixtures thereof. In the foregoing formulas, R represents alkylene, arylene, alkarylene or aralkylene having 1 to 12 carbon atoms; R' represents alkyl, aryl, alkaryl, or aralkyl having 2 to 18 carbon atoms; R''' represents alkyl having 6 to 11 carbon atoms or phenyl; R° represents R' or H; and n is 1 or 2.

Illustrative of the acidic compounds that can be used to stabilize the liquid antimony organic sulfur- and/or oxygen-containing compounds are the following: ethyl thioglycolate, hexyl thioglycolate, 2-ethylhexyl thioglycolate, isooctyl thioglycolate, isodecyl thioglycolate, dodecyl thioglycolate, isobutyl 3-mercaptopropionate, 2-ethylhexyl 3-mercaptopropionate, benzyl 4-mercaptobutyrate, phenyl 4-mercaptobutyrate, isooctyl mercaptan, decyl mercaptan, lauryl mercaptan, phenyl mercaptan, tolyl mercaptan, benzyl mercaptan, thioglycolic acid, 2-mercaptopropionic acid, 3-mercaptopropionic acid, 2-mercaptobutyric acid, 3-mercaptobutyric acid, 3-mercapto-2,3-dimethylbutyric 3-mercapto-4-ethylhexanoic acid, 2-mercaptophenylacetic acid, 2-mercaptoethanol, 2-mercapto-1-propanol, 1-mercapto-2-propanol, 2-mercapto-4-ethylhexanol, 2-mercapto-1-butanol, 3-mercapto-1,3-propanediol, o-mercaptobenzyl alcohol, heptanoic acid, 2-ethylhexanoic acid, 2-ethylheptanoic acid, isononanoic acid, decanoic acid, isododecanoic acid, benzoic acid, and mixtures thereof.

In a preferred embodiment of the invention, thiolactic acid alone or in combination with another acidic compound is used to stabilize the liquid antimony organic sulfur- and/or oxygen-containing compounds. When an antimony stabilizer composition that contains thiolactic acid or a combination of thiolactic acid and, e.g., isooctyl thioglycolate or 3-mercaptopropionic acid is incorporated into a vinyl halide resin composition, the resulting stabilized resinous composition is characterized by exceptionally good early color and clarity.

The acidic compound that is used to stabilize a liquid antimony organic sulfur- and/or oxygen-containing compound may be the same acidic compound that was used in the preparation of the antimony organic compound, or it may be a different one.

The amount of the acidic compound that is incorporated into the antimony organic sulfur- and/or oxygen-containing compounds is that which will impart the desired shelf-stability to the antimony compounds. In most cases, from 1% to 40% by weight of one or more acidic compound, based on the weight of the stabilized antimony stabilizer composition, is used. It is generally preferred that 2% to 10% by weight of the acidic compound, based on the weight of the stabilized antimony stabilizer composition, be used to stabilize an antimony organic sulfur-containing compound and that 20% to 35% by weight of the acidic compound, based on the weight of the stabilized antimony stabilizer composition, be used to stabilize an antimony organic oxygen-containing compound. Best results have been obtained when 2% to 4% by weight of thiolactic acid or a mixture of thiolactic acid and either isooctyl thioglycolate or another acidic compound was incorporated into an antimony tris-(mercaptoacid ester).

The shelf-stable liquid antimony stabilizer compositions may be prepared by any suitable and convenient procedure. For example, they can be prepared by reacting antimony oxide with a stoichiometric excess of an acid component that contains one or more organic compounds having active thiol or carboxylic hydrogen atoms. They can also be prepared by adding a stabilizing amount of acidic compound to a liquid antimony organic sulfur- and/or oxygen-containing compound prepared by the reaction of antimony oxide with 3 moles per mole of antimony of an organic sulfur- and/or oxygen-containing compound or to a solution of the antimony organic sulfur- and/or oxygen-containing compound in a hydrocarbon solvent. Alternatively, the stabilized antimony stabilizer compositions can be prepared by reaction antimony oxide with an amount of the acid component in excess of that required stoichiometrically and adding an additional amount of an acidic compound to the reaction product or to a solution of the reaction product in a hydrocarbon solvent.

In a preferred embodiment of the invention, there is formed a reaction mixture that contains antimony oxide, 3 moles per mole of antimony in the reaction mixture of an acidic organic sulfur- and/or oxygen-containing compound as hereinbefore defined, and 1% to 40%, based on the total weight of antimony oxide and the acidic organic sulfur- and/or oxygen-containing compound, of an acidic organic compound that is a mrcaptoacid ester, mercaptan, mercaptoacid, mercaptoalcohol, or monocarboxylic acid, as hereinbefore defined. The reaction may also contain a hydrocarbon solvent, such as toluene, xylene, or mineral spirits. The reaction mixture that contains antimony oxide and excess acid component is heated at a temperature in the range of 90° to 150° C. at a pressure in the range of 70 mm to 760 mm Hg absolute to form a clear, stable liquid antimony composition. This composition is then cooled and filtered; it may be diluted with mineral oil, mineral spirits, or another hydrocarbon solvent to bring its antimony content to a desired lower level, which is preferably 10% to 12% by weight.

In another preferred embodiment of the invention, there is formed a reaction mixture that contains antimony oxide, 3 moles per mole of antimony in the reaction mixture of an acidic organic sulfur- and/or oxygen-containing compound as hereinbefore defined, and a portion, usually about 20% to 80%, of the stabilizing amount of the acidic organic compound. This reaction mixture, which may also contain a hydrocarbon solvent, is heated at a temperature in the range of 90° to 150° C. at a pressure in the range of 70 mm to 760 mm Hg absolute to form a clear liquid antimony stabilizer composition. After this composition has been cooled, filtered, and diluted with a hydrocarbon solvent to bring its antimony content to the desired level, the remainder of the acidic organic compound, which is usually 20% to 80% of the stabilizing amount, is added to the liquid antimony stabilizer composition.

Only a small amount of one of the stabilized liquid antimony stabilizers need be incorporated into vinyl halide resin compositions to impart heat and light stability to them. As little as 0.2% of one of these stabilizers, based on the weight of the vinyl halide resin, will bring about an appreciable improvement in the heat stability of the compositions. Five percent or more of the stabilizers can be used, but these larger amounts generally do not provide further improvement in the properties of the resinous compositions and for this reason are not ordinarily used. In most cases, from 0.3% to 3% by weight, based on the weight of the vinyl halide resin, of the stabilizer gives the most advantageous results.

The vinyl halide resins that may be present in the stabilized resinous compositions include both vinyl halide homopolymers, such as polyvinyl chloride, polyvinyl bromide, and polyvinylidene chloride, and copolymers formed by the polymerization of a vinyl halide with up to about 30 percent of a comonomer, such as vinyl acetate, vinyl propionate, vinyl butyrate, vinylidene chloride, styrene, ethylene, propylene, ethyl acrylate, methyl methacrylate, acrylic acid, and the like. The invention is also applicable to mixtures containing a major proportion of a vinyl halide resin and a minor proportion of another synthetic resin, such as chlorinated polyethylene, polyacrylate resins, polymethacrylate esters, polyacrylonitrile, and terpolymers of acrylonitrile, butadiene, and styrene, Any of the well-known plasticizers for vinyl halide resins, such as dioctyl phthalate, dibutyl sebacate, tricresyl phosphate, and octyl diphenyl phosphate, can be present in the stabilized compositions.

In addition to the aforementioned ingredients, the stabilized resinous compositions may contain other resin additives, such as pigments, dyes, processing aids, impact modifiers, extenders, and lubricants, in the amounts ordinarily employed for the purposes indicated.

The stabilized vinyl halide resin compositions may be prepared by any suitable and convenient procedure. Such procedures include dry blending with a conventional mixer such as the Henschel blender, mixing on a two or three roll heated mill, and tumbling.

The invention is further illustrated by the following examples. In these examples, all parts are parts by weight and all percentages are percentages by weight.

EXAMPLE 1

A mixture of 381.5 parts (1.848 moles) of isooctyl thioglycolate (99%) and 79.7 parts (0.546 mole) of antimony oxide (83.5% Sb) was sparged with nitrogen and heated at 95° to 100° C. at a pressure of 120–125 mm Hg absolute for one hour during which time 14.7 parts of water was evolved and collected. The reaction mixture, which contained very little antimony oxide, was filtered through clay.

There was obtained 431.6 parts of a clear liquid product that contained 15.3% Sb. This product, which consisted of 90.9% antimony tris-(isooctyl thioglycolate) and 9.1% of isooctyl thioglycolate, remained clear on standing at room temperature for more than one year.

EXAMPLE 2

A. A mixture of 469.5 parts (2.27 moles) of isooctyl thioglycolate (99%) and 98.8 parts (0.677 mole) of antimony oxide (83.5% Sb) was sparged with nitrogen and heated at 100°–110° C. at a pressure of 80–85 mm Hg absolute for one hour during which time 18.1 parts of water was evolved and collected. The reaction mixture was filtered through clay.

There was obtained 537.2 parts of clear, stable liquid product that contained 15.0% Sb. This product consisted of 90.9% of antimony tris (isooctyl thioglycolate) and 9.1% of isooctyl thioglycolate.

B. To 38.3 parts of the product of Example 2A was added 11.7 parts of mineral oil. A clear stable liquid product was obtained that contained 7% of isooctyl thioglycolate and had an antimony content of 11.5%.

C. To 38.3 parts of the product of Example 2A were added 1.0 part of thiolactic acid and 10.7 parts of mineral oil at ambient temperature. A clear stable liquid product was obtained that contained 2% of thiolactic acid and 7.0% of isooctyl thioglycolate and that had an antimony content of 11.5%.

D. To 38.3 parts of the product of Example 2A were added 2.0 parts of thiolactic acid and 9.7 parts of mineral oil at ambient temperature. A clear stable liquid product was obtained that contained 4% of thiolactic acid and 7.0% of isooctyl thioglycolate and that had an antimony content of 11.5%.

EXAMPLE 3

A. A reaction mixture that contained 1.9% excess acid component was prepared from 419.5 parts (2.035 moles) of isooctyl thioglycolate (99%), 10.0 parts (0.094 mole) of 3-mercaptopropionic acid, and 98.8 parts (0.677 mole) of antimony oxide (83.5% Sb). The reaction mixture was sparged with nitrogen and heated at 100°–110° C. at a pressure of 80–85 mm Hg absolute for one hour during which the theoretical amount of evolved water was removed from it and substantially all of the antimony oxide reacted. It was then filtered through clay.

There was obtained 497.0 parts of a clear stable liquid product that contained 1.9% unreacted acid component (isooctyl thioglycolate and 3-mercaptopropionic acid) and that had an antimony content of 16.2%.

B. To 35.5 parts of the product of Example 3A was added 14.5 parts of mineral oil. A clear stable liquid product that contained 1.2% of unreacted acid component and that had an antimony content of 11.5% was obtained.

C. To 21.3 parts of the product of Example 3A were added 1.2 parts of thiolactic acid and 7.5 parts of mineral oil. A clear stable liquid product was obtained that contained 4% of thiolactic acid and 1.3% of the unreacted acid component that contained isooctyl thioglycolate and 3-mercaptopropionic acid and that had an antimony content of 11.5%.

EXAMPLE 4

A. The procedure described in Example 3A was repeated except that 10.0 parts (0.094 mole) of thiolactic acid was used in place of the 3-mercaptopropionic acid. There was obtained 496.7 parts of a clear, stable liquid product that contained 1.9% unreacted acid component (isooctyl thioglycolate and thiolactic acid) and that had an antimony content of 16.2%.

B. To 35.5 parts of the product of Example 4A was added 14.5 parts of mineral oil. There was obtained a clear, stable liquid product that contained 1.2% unreacted acid component and that had an antimony content of 11.5%

C. To 35.5 parts of the product of Example 4A was added 1.35 parts of thiolactic acid and 13.15 parts of mineral oil. A clear, stable liquid product was obtained that contained 4% of an unreacted acid component that contained a major amount of thiolactic acid and a minor amount of isooctyl thioglycolate.

EXAMPLE 5

A mixture of 448.4 parts (2.172 moles) of isooctyl thioglycolate, 25.0 parts (0.174 mole) of 2-ethylhexanoic acid, and 99.7 parts (0.683 mole) of antimony oxide (83.5% Sb) was heated at 125°–130° C. at a pressure of 100–110 mm Hg absolute for two hours during which time 18.4 parts of water was collected and substantially all of the antimony oxide reacted. The reaction mixture was filtered through clay.

There was obtained 537.8 parts of a clear, shelf-stable liquid product that contained 15.0% Sb and 9.0% of unreacted acid component (isooctyl thioglycolate and 2-ethylhexanoic acid).

EXAMPLE 6

A reaction mixture that contained 1.9% excess acid component was prepared from 419.5 parts (2.032 moles) of isooctyl thioglycolate, 10.0 parts (0.109 mole) of thioglycolic acid, and 98.8 parts (0.677 mole) of antimony oxide (83.5% Sb). The reaction mixture was sparged with nitrogen and heated at 100°–110° C. at a pressure of 80–85 mm Hg absolute for one hour during which time the theoretical 18.3 parts of water was collected and substantially all of the antimony oxide reacted. It was then filtered through clay.

There was obtained 497 parts of a clear, shelf-stable liquid product that contained 1.9% of unreacted acid component (isooctyl thioglycolate and thioglycolic acid) and that had an antimony content of 16.3%.

EXAMPLE 7

The procedure described in Example 6 was repeated except that 10 parts (0.094 mole) of 3-mercaptopropionic acid was used in place of the thioglycolic acid. There was obtained 497 parts of a clear, shelf-stable liquid product that contained 1.9% of unreacted acid component (isooctyl thioglycolate and 3-mercaptopropionic acid) and had an antimony content of 16.2%.

EXAMPLE 8

The procedure described in Example 6 was repeated except that 10 parts (0.128 mole) of mercaptoethanol was used in place of the thioglycolic acid. There was obtained 496.7 parts of a clear, shelf-stable liquid product that contained 1.9% of unreacted acid component (isooctyl thioglycolate and 2-mercaptoethanol) and had an antimony content of 16.1%.

EXAMPLE 9

A reaction mixture that contained 2.9% excess acid component was prepared from 279.4 parts (1.354 moles) of lauryl mercaptan (98%), 139.8 parts (0.679 mole) of isooctyl thioglycolate, 15.0 parts (0.142 mole) of 3-mercaptopropionic acid, and 98.8 parts (0.677 mole) of antimony oxide (83.5% Sb). The reaction mixture was sparged with nitrogen and heated at 100°–110° C. at a pressure of 80–85 mm Hg absolute for one hour during which the theoretical amount of water was collected and substantially all of the antimony oxide reacted. It was then filtered through clay.

There was obtained 503.3 parts of a clear, stable liquid product that contained 16.0% Sb. This material became a waxy solid when stored at ambient temperature, but when heated it became a clear liquid.

EXAMPLE 10

The procedure described in Example 9 was repeated except that the acid component consisted of 139.7 parts (0.677 mole) of lauryl mercaptan and 279.6 parts (1.354 mole) of isooctyl thioglycolate and 15.0 parts of 3-mercaptopropionic acid (0.142 mole). There was obtained 502.7 parts of a clear, stable liquid product that contained 2.9% excess acid component and that had an antimony content of 16.1%.

EXAMPLE 11

A reaction mixture that contained 1.9% excess acid component was prepared from 321.4 parts (1.557 moles) of isooctyl thioglycolate, 85.4 parts (0.389 mole) of glycol dimercaptoacetate (95.8%), 10 parts (0.094 mole) of 3-mercaptopropionic acid, and 113.5 parts (0.778 mole) of antimony oxide (83.5% Sb). The reaction mixture was sparged with nitrogen and heated at 100°–110° C. at a pressure of 80–85 mm Hg absolute for one hour during which time the theoretical amount of water was collected and substantially all of the antimony oxide reacted. It was then filtered through clay. The product was a clear, stable liquid product that contained 18.6% Sb.

EXAMPLE 12

A mixture of 417.3 parts (3.20 moles) of n-heptanoic acid, 101.8 parts (0.698 mole) of antimony oxide (83.5% Sb), and 80.0 parts of toluene was heated at its reflux temperature (165°–172° C.) for about 12 hours during which time the theoretical 18.8 parts of water was collected by azeotropic distillation. The toluene was removed by vacuum distillation, and the residue was filtered.

There was obtained 482 parts of a clear liquid that contained 17.0% Sb. This product, which crystallized when it was stored at ambient temperature but became a clear liquid when heated, consisted of 71.2% of antimony tris-(n-heptanoate) and 28.8% of n-heptanoic acid.

EXAMPLE 13

The procedure described in Example 12 was repeated except that 483.9 parts (3.34 moles) of 2-ethylhexanoic acid was used in place of the n-heptanoic acid. There was obtained 545.3 parts of a clear, shelf-stable liquid product that contained 14.9% Sb. This product consisted of 68.2% of antimony tris-(2-ethylhexanoate) and 31.8% of 2-ethylhexanoic acid.

EXAMPLE 14

The procedure described in Example 12 was repeated except that 426.8 parts (2.68 moles) of isononanoic acid (3,5,5-trimethylhexanoic acid) was used in place of the n-heptanoic acid with 89.8 parts of antimony oxide (0.616 mole). There was obtained 485.0 parts of a clear, shelf-stable liquid product that contained 15.1% Sb. This product consisted of 73.5% antimony tris-(isononanoate) and 26.5% isononanoic acid.

EXAMPLE 15

A mixture of 100 parts of polyvinyl chloride (Tenneco 225), 1.0 part of lubricant (Wax XL-355), 0.4 part of calcium stearate, 1.0 part of titanium dioxide, and 1.0 part of calcium carbonate was blended in a Henschel mixer until a uniform composition was obtained. Sixty parts of this composition and 0.4 part of one of the stabilizers of this invention were worked in a Brabender Plasticorder using a bowl temperature of 180° C. at a rotor speed of 60 rpm. After the material had fused in the roller head, samples were removed at one minute intervals and observed for color development. The results obtained are summarized in Table I. In this table, a rating of 1-2 denotes white; 3-4, off-white; 5-6, cream; 7-8, tan; and 9-10, brown.

TABLE I

| Stabilizer | Color after indicated number of minutes in a Brabender Plasticorder at 180° C. | | | | | | | | | |
|---|---|---|---|---|---|---|---|---|---|---|
| | 1 | 2 | 3 | 4 | 5 | 6 | 7 | 8 | 9 | 10 |
| Prod. of Ex. 1 | 2 | 2 | 3 | 3 | 4 | 4+ | 6 | 6+ | 7 | 8 |
| Prod. of Ex. 2B | 2 | 3 | 3 | 4 | 6 | 7 | 8 | 8+ | 9+ | 10 |
| Prod. of Ex. 2C | 1 | 2 | 2 | 3 | 4 | 6 | 7 | 7+ | 9 | 9+ |
| Prod. of Ex. 2D | 1 | 1 | 2 | 3 | 4 | 6 | 7 | 8 | 9+ | 10 |
| Prod. of Ex. 3B | 2 | 3 | 4 | 5 | 6 | 6+ | 7 | 8 | 9 | 10 |
| Prod. of Ex. 3C | 1 | 2 | 3 | 4 | 5 | 6 | 7 | 8 | 9 | 10 |
| Prod. of Ex. 4B | 2 | 2 | 2 | 4 | 5 | 6 | 7 | 8 | 9 | 10 |
| Prod. of Ex. 4C | 1 | 1 | 2 | 3 | 5 | 6 | 7 | 8 | 9 | 10 |
| Prod. of Ex. 7 | 2 | 3 | 4 | 4+ | 5 | 6 | 6+ | 7+ | 9 | 10 |

From the data in Table I, it will be seen that while all of the stabilizers of this invention were effective those that contained thiolactic acid, that is, the products of Examples 2C, 2D, 3C, 4B, and 4C, were particularly effective in that they imparted to the compositions excellent early color, e.g., good color at 1 to 3 minutes, which is the critical period in the extrusion process.

COMPARATIVE EXAMPLE A

A mixture of 340.9 parts (1.651 moles) of isooctyl thioglycolate and 79.7 parts (0.546 mole) of antimony oxide (83.5% Sb) was sparged with nitrogen and heated at 100°-130° C. at a pressure of 120-125 mm Hg absolute for two hours. The reaction product, which contained a considerable amount of unreacted antimony oxide, was filtered through clay. The filtrate was a very hazy liquid.

COMPARATIVE EXAMPLE B

A mixture of 340.9 parts (1.651 moles) of isooctyl thioglycolate, 79.7 parts (0.546 mole) of antimony oxide (83.5% Sb), and 150 parts of toluene was heated at its reflux temperature (110°-133° C.) for 6 hours. At the end of this time, the reaction was still incomplete, and the reaction mixture contained a large amount of unreacted antimony oxide.

EXAMPLE 16

To portions of the product of Comparative Example A were added the following amounts of acidic compounds:

| Ex. No. | Acidic Compound | % of Acidic Compound Added (based on weight of composition) |
|---|---|---|
| 16 A | Thiolactic Acid | 2.0 |
| 16 B | Thioglycolic Acid | 2.5 |
| 16 C | 2-Ethylhexanoic Acid | 10.0 |
| 16 D | Lauryl mercaptan | 3.0 |
| 16 E | Isooctyl thioglycolate | 5.0 |

The resulting mixtures were heated to form homogeneous solutions and then cooled to ambient temperature. In each case, a clear, shelf-stable liquid product was obtained.

What is claimed is:

1. A heat and light stable resinous composition that comprises a vinyl halide resin and from 0.2% to 5% by weight of a shelf-stable liquid antimony stabilizer composition selected from the group consisting of
   A. liquid antimony organic sulfur-containing compounds selected from the group consisting of
      (1) antimony mercaptoacid esters having the formula $Sb(SRCOOR')_3$;
      (2) antimony mercaptides having the formula $Sb(SR')_3$;
      (3) antimony (mercaptoacid ester) (mercaptides) having the formula $(R'S)_n Sb(SRCOOR')_{3-n}$;
      (4) Bis(antimony di-(mercaptoacid ester)) alkylene glycol dimercaptoacid esters having the formula $(R'OOCRS)_2\text{-}Sb\text{-}S\text{-}(CH_2)_m\text{-}COO\text{-}(CH_2)_p\text{-}OOC\text{-}(CH_2)_m\text{-}S\text{-}Sb\text{-}(SRCOOR')_2$; and
      (5) Bis(antimony di-(mercaptide or mercaptoacid ester)) sulfides having the formula $(R''S)_2\text{-}Sb\text{-}S\text{-}Sb\text{-}(SR'')_2$; and
      (6) mixtures thereof
   and 2% to 10% by weight of an acid organic compound selected from the group consisting of mercaptans of the formula $HSR'$, mercaptoacids of the formula $HS\text{-}(CR^\circ_2)_n\text{-}COOH$, mercaptoalcohols of the formula $HS\text{-}(CR^\circ_2)_n\text{-}CH_2OH$, monocarboxylic acids of the formula $R'''COOH$, and mixtures thereof, wherein R represents alkylene, arylene, aralkylene, or alkarylene having 1 to 8 carbon atoms; R' represents alkyl, aryl, alkaryl, or aralkyl having 2 to 18 carbon atoms; R'' represents —R-COOR' or alkyl, aryl, aralkyl, or alkaryl having 2 to 18 carbon atoms; R''' represents alkyl having 6 to 11 carbon atoms or phenyl; R° represents R' or H; m is 1, 2, 3, or 4; n is 1 or 2; and p is 2, 3, or 4;
   B. liquid antimony carboxylates having the formula $Sb(OOCR''')_3$ and 20% to 35% by weight of a monocarboxylic acid having the formula $R'''COOH$; and
   C. mixtures thereof.

2. A heat and light stable resinous compositions as defined in claim 1 wherein the liquid antimony stabilizer composition comprises an antimony carboxylate and a monocarboxylic acid.

3. A heat and light stable resinous composition as defined in claim 2 wherein the liquid antimony stabilizer composition comprises an antimony carboxylate and 2-ethylhexanoic acid.

4. A heat and light stable resinous composition as defined in claim 1 wherein the liquid antimony stabilizer composition comprises antimony tris-(n-heptanoate) and n-heptanoic acid.

5. A heat and light stable resinous composition as defined in claim 1 wherein the liquid antimony stabilizer comprises a liquid antimony organic sulfur-containing compound and 2% to 10% by weight of an acidic organic compound.

6. A heat and light stable resinous composition as defined in claim 5 wherein the acidic organic compound is thiolactic acid.

7. A heat and light stable resinous composition as defined in claim 5 wherein the acidic organic compound is thioglycolic acid.

8. A heat and light stable resinous composition as defined in claim 5 wherein the acidic organic compound is 2-mercaptoethanol.

9. A heat and light stable resinous composition as defined in claim 5 wherein the acidic organic compound is 2-ethylhexanoic acid.

10. A heat and light stable resinous composition as defined in claim 5 wherein the acidic organic compound is 3-mercaptopropionic acid.

11. A heat and light stable resinous composition as defined in claim 5 wherein the liquid antimony stabilizer comprises antimony tris-(isooctyl thioglycolate) and 2% to 4% by weight of thiolactic acid.

12. A shelf-stable liquid antimony stabilizer composition for vinyl halide resin compositions that comprises
A. a liquid antimony organic sulfur-containing compound selected from the group consisting of
 (1) antimony mercaptoacid esters having the formula $Sb(SRCOOR')_3$;
 (2) antimony mercaptides having the formula $Sb(SR')_3$;
 (3) antimony (mercaptoacid ester) (mercaptides) having the formula $(R'S)_n Sb(SRCOOR')_{3-n}$;
 (4) Bis(antimony di(mercaptoacid ester)) alkylene glycol dimercaptoacid esters having the formula $(R'OOCRS)_2 Sb-S-(CH_2)_m-COO-(CH_2)_p-OOC-(CH_2)_m-S-Sb-(SRCOOR')_2$;
 (5) Bis(antimony di-(mercaptide or mercaptoacid ester)) sulfides having the formula $(R''S)_2-Sb-S-Sb-(SR'')_2$; and
 (6) mixtures thereof and
B. 2% to 10% by weight of an acidic organic compound selected from the group consisting of mercaptans of the formula $HSR'$, mercaptoacids of the formula $HS-(CR°_2)_n-COOH$, mercaptoalcohols of the formula $HS-(CR°_2)_n-CH_2OH$, monocarboxylic acids of the formula $R'''COOH$, and mixtures thereof, wherein R represents alkylene, arylene, aralkylene or alkarylene having 1 to 8 carbon atoms; R' represents alkyl, aryl, alkaryl, or aralkyl having 2 to 18 carbon atoms; R'' represents —R-COOR' or alkyl, aryl, alkaryl, or aralkyl having 2 to 18 carbon atoms; R''' represents alkyl having 6 to 11 carbon atoms or phenyl; R° represents R' or H; m is 1, 2, 3, or 4; n is 1 or 2; and p is 2, 3, or 4.

13. A shelf-stable liquid antimony stabilizer composition as defined in claim 12 wherein the acidic organic compound is thiolactic acid.

14. A shelf-stable liquid antimony stabilizer composition as defined in claim 12 wherein the acidic organic compound is 2-ethylhexanoic acid.

15. A shelf-stable liquid antimony stabilizer composition as defined in claim 12 wherein the acidic organic compound is 2-mercaptoethanol.

16. A shelf-stable liquid antimony stabilizer composition as defined in claim 12 that comprises antimony tris-(isooctyl thiolycolate) and 2% to 4% by weight of thiolactic acid.

* * * * *